(12) United States Patent
Podpaly et al.

(10) Patent No.: US 10,865,817 B2
(45) Date of Patent: Dec. 15, 2020

(54) COMPENSATING FOR ORIENTATION OF A VALVE POSITIONER ON A VALVE ASSEMBLY

(71) Applicant: Dresser, LLC, Houston, TX (US)

(72) Inventors: Anatoly Podpaly, Sharon, MA (US); Jagadish Gattu, Southborough, MA (US); Mark Edmund Hebert, North Attleborough, MA (US)

(73) Assignee: Dresser, LLC, Houston, TX (US)

( * ) Notice: Subject to any disclaimer, the term of this patent is extended or adjusted under 35 U.S.C. 154(b) by 32 days.

(21) Appl. No.: 16/156,232

(22) Filed: Oct. 10, 2018

(65) Prior Publication Data

US 2020/0116171 A1  Apr. 16, 2020

(51) Int. Cl.
*F15B 21/02* (2006.01)
*F15B 19/00* (2006.01)
*F15B 21/08* (2006.01)

(52) U.S. Cl.
CPC ............ *F15B 21/02* (2013.01); *F15B 19/002* (2013.01); *F15B 19/005* (2013.01); *F15B 21/087* (2013.01); *F15B 2211/865* (2013.01)

(58) Field of Classification Search
None
See application file for complete search history.

(56) References Cited

U.S. PATENT DOCUMENTS

| 7,231,825 | B2 | 6/2007 | Davidson |
| 7,627,441 | B2 | 12/2009 | Longsdorf et al. |
| 8,358,321 | B1 | 1/2013 | Weidner |
| 9,772,046 | B2 | 9/2017 | Kullen et al. |
| 9,945,701 | B2 | 4/2018 | Jelken et al. |
| 2005/0067600 | A1 | 3/2005 | Wilfert |
| 2007/0273496 | A1* | 11/2007 | Hedtke ............ G01H 1/08 340/506 |
| 2011/0048556 | A1* | 3/2011 | Carter ............ G01D 21/00 137/559 |
| 2014/0005960 | A1 | 1/2014 | Anderson et al. |

(Continued)

FOREIGN PATENT DOCUMENTS

| JP | 2009538473 A | 11/2009 |
| JP | 2012508354 A | 4/2012 |

(Continued)

*Primary Examiner* — Ryan A Jarrett
(74) *Attorney, Agent, or Firm* — Paul Frank + Collins P.C.

(57) ABSTRACT

A valve positioner for use on a process control valve or "valve assembly." The process control valve may include a pneumatic actuator and a valve having a closure member coupled with the pneumatic actuator and moveable relative to a seat. The valve positioner may couple to the pneumatic actuator to provide a pneumatic signal to set a position of the closure member relative to the seat. An accelerometer may couple with the valve positioner. The accelerometer may generate data in response to orientation of the valve positioner. In one implementation, the configurations can use this data to ensure proper visualization of data on a display. The data also permits the device to properly manage operating modes, like tight shut-off or fully-opened mode, that may prevail due to orientation issues that cause defects in a measured position for a closure member that regulates flow of material through the valve assembly.

17 Claims, 10 Drawing Sheets

(56) References Cited

U.S. PATENT DOCUMENTS

| | | |
|---|---|---|
| 2014/0261792 A1 | 9/2014 | Ogata |
| 2016/0025765 A1 | 1/2016 | Pather et al. |
| 2016/0041539 A1 | 11/2016 | Kemp et al. |
| 2017/0285611 A1 | 10/2017 | Podpaly et al. |
| 2020/0003330 A1* | 1/2020 | Jagoda .................... F15B 13/08 |

FOREIGN PATENT DOCUMENTS

| | | |
|---|---|---|
| JP | 2013130236 A | 7/2013 |
| JP | 2016075362 A | 5/2016 |

* cited by examiner

COMPENSATING FOR ORIENTATION OF A VALVE POSITIONER ON A VALVE ASSEMBLY

BACKGROUND

Process control valves are a type of process device that finds use to automate industrial processes. These devices may include a controller, or "valve positioner," that maintains operation of other components to regulate flow of materials on a process line. Problems with one or more control valves may disrupt processes or prevent the process line, in whole or in part, from operating in accordance with necessary process parameters. These disruptions can lower yields and reduce quality. In large, industrial operations, failures in the process line may lead to significant expense due to downtime necessary to troubleshoot and repair the problematic device(s).

SUMMARY

The subject matter of this disclosure relates to improvements to avoid operating defects that may result from maintenance on process devices. Of particular interest herein are embodiments that can generate data that measures orientation of the valve positioner relative to other parts of the valve assembly. These embodiments may use this data to ensure that information displays to an end user independent of the orientation, as well as to expedite maintenance tasks to repair or upgrade existing hardware, or integrate new hardware, onto the valve assembly without the need to recalibrate or otherwise engage in lengthy commissioning procedures.

DRAWINGS

Reference is now made briefly to the accompanying drawings, in which.

Figure 1:
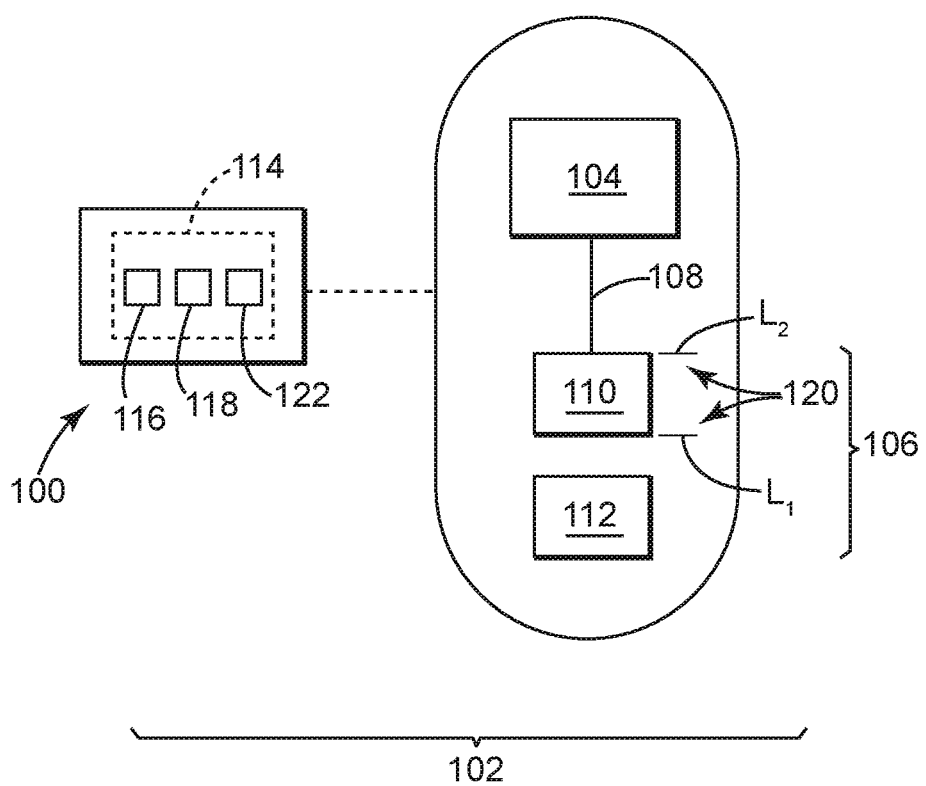
FIG. 1 depicts a schematic diagram of an exemplary embodiment of a valve positioner.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments of process control devices. These embodiments illustrate certain improvements in valve assemblies, like those found in industrial process systems to regulate flow of materials on process lines. Other embodiments are within the scope of the subject matter herein.

FIG. 1 depicts a schematic diagram of an exemplary embodiment of a valve positioner 100. This embodiment is shown as part of a valve assembly, identified generally by the numeral 102. The valve assembly 102 may include an actuator 104 that couples with a valve 106, typically by way of a valve stem 108 that connects to a closure member 110. The actuator 104 modulates movement of the closure member 110 relative to a seat 112. In practice, the valve positioner 100 may have operating hardware 114 that includes a display unit 116. The operating hardware 114 may also include a position sensor 118 to identify proximity of the closure member 110 to hardstop limits 120 (shown here as a lower limit $L_1$ and an upper limit $L_2$). As also shown, the operating hardware 114 may further include a measurement unit 122 that couples with the valve components, for example, the valve stem 108.

At a high level, the valve positioner 100 may be configured to generate data that describes its orientation. These configurations may have functionality to utilize this data to correct for differences in orientation that can frustrate some operations on the device. This functionality may ensure that data properly displays on the display unit 116 found on the valve positioner 100. As an added benefit, the functionality may also permit the valve positioner 100 to more accurately initiate operating modes that trigger in response to the closure member 110 at or near the hardstop limits 120.

The valve assembly 102 may be configured for use on process lines that serve a variety of industries. These configurations may integrate into conduits, like pipes and pipelines, as part of a process line or lines that transfer materials around chemical facilities, refineries, oil & gas recovery systems, and the like. In one implementation, the valve positioner 100 connects to a control network (or "distributed control system" or "DCS,") which maintains operation of all devices on the process line to ensure that materials flow in accordance with a process. The DCS may include a controller that generates a control signal with operating parameters for the valve assembly 102 for this purpose. These operating parameters define a commanded position for the closure member 110 relative to the seat 112.

The actuator 104 may be configured to generate a load that works against pressure of material to set the commanded position of the closure member 110. These configurations may employ pneumatic devices, although electrical or electronic devices (e.g., motors) may work as well. Pneumatic devices may have a diaphragm internal to a housing. In operation, the valve positioner 100 may deliver gas, or "instrument air," as a pneumatic signal that changes pressure that acts against the diaphragm inside of the housing. Parameters for the pneumatic signal depend in large part on the commanded position for the closure member 110.

The valve 106 may be configured to fix flow parameters for materials that flow into the process line. These configurations often include hardware that couples with the pipes or pipelines. Manufacture of this hardware often comports with properties of the materials, including its composition and "phase," for example, solid, fluid, or solid-fluid mix. The closure member 110 may embody a plug, ball, butterfly valve, or like implement that can contact the seat 112 to prevent flow. Location of the closure member 110 relative to the seat 112, in turn, permits more or less flow of material to satisfy the process parameters.

The operating hardware 114 may be configured to process and generate signals. These configurations may employ electrical and computing components (e.g., processors, memory, executable instructions, etc.). These components may also include electro-pneumatic devices that operate on incoming instrument air. The display unit 116 may include devices to convey information about operation of the valve assembly 102. These devices may have a "default" display orientation that coincides with a preferred reading orientation for an end user. The position sensor 118 may leverage non-contact modalities (e.g., magnetics) to generate data that defines a measured position of the closure member 110. These modalities are useful to allow the valve positioner 100 to easily separate from (and install onto) the valve assembly 102. This feature simplifies maintenance and, in some applications, allows technicians to remove and replace the valve positioner 100 as part of tasks to repair, upgrade, or maintain the device. In operation, the operating hardware 114 may process the control signal from the DCS and the positioner sensor 118 to set the pneumatic signal that operates the actuator 104 to locate the closure member 110 at the commanded position to achieve flow of material through the valve 106 to meet process parameters.

The hardstop limits 120 may be configured as values to manage travel of the closure member 110. These values may correspond to a maximum "travel" and a minimum "travel" for the closure member 110 relative to the seat 112. The operating hardware 114 may compare the measured position for the closure member 110 against these values to initiate one or more operating "modes." A "fully-opened" mode will cause the closure member 110 to reaches it farthest position from the seat 112 in proximity to the upper limit $L_2$. In "tight shut-off" mode, the operating hardware 114 may locate the closure member 110 in its closed position (in contact with the seat 112) in response to commanded positions below the "lower" hardstop limit $L_1$. For example, if the lower limit $L_1$ is 10%, then the operating hardware 114 adjusts the pneumatic signal so that the closure member 110 contacts the seat 112 at commanded positions below 10% and operate as normal for commanded positions above 10%. The tight shut-off mode is useful to prevent operating conditions that arise with the closure member 110 in close proximity to the seat 112. These operating conditions cause the working fluid to flow at high flow rates or velocity that can cause wear and damage that can degrade performance and life span of the valve assembly 102.

The measurement unit 122 may be configured to provide data to the operating hardware 114. These configurations may embody sensors that generate signals in response to orientation of the valve positioner 100. The sensors may include devices that can generate data that describes (or measures) slope or angle of objects. The operating hardware 114 may use this data to account for changes in orientation that might be detrimental to operation of the valve assembly 102. For example, the operating hardware 114 may maintain the preferred reading orientation on the display unit 120 independent of the orientation of the valve positioner 100. This feature can prevent text or other visualizations from appearing "upside" down to the end user. The operating hardware 114 may account for orientation to ensure that the device operates in appropriate operating modes at the hardstop limits 120. This feature can prevent use of the tight shut-off mode either to "early" (at commanded positions that are above the actual lower limit 116) or to "late" (at commanded positions that are below the actual lower limit 116).

Figure 2:
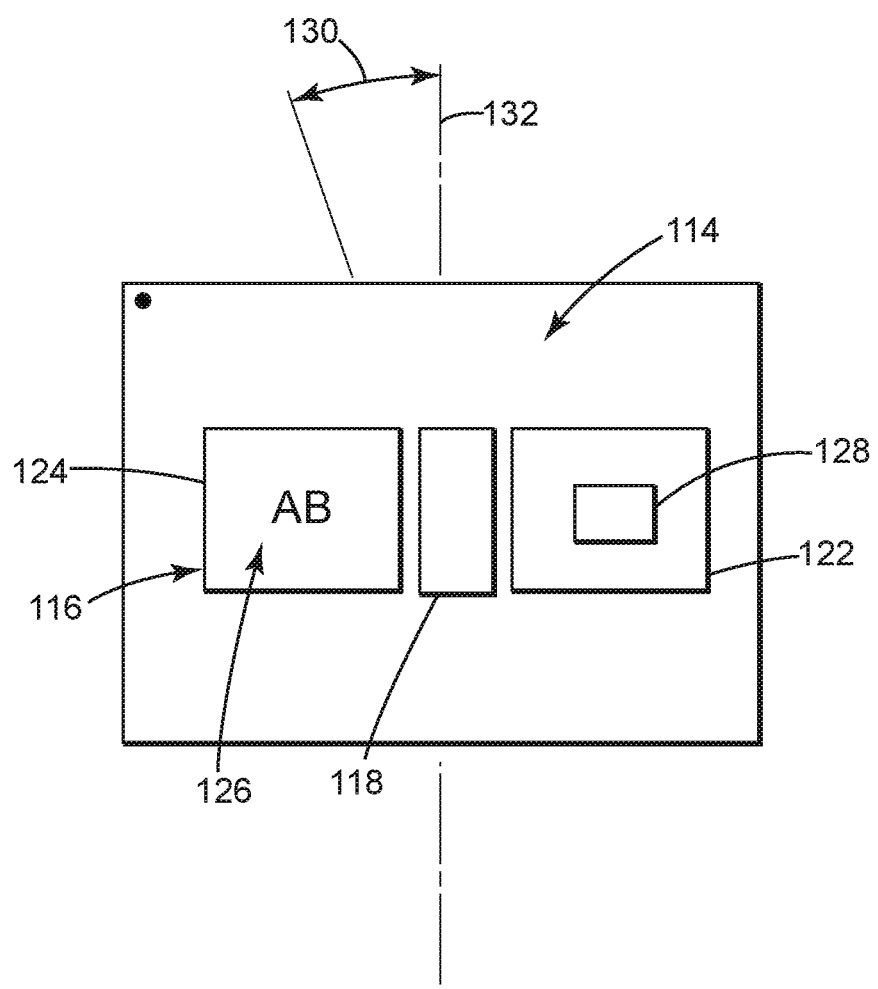
FIG. 2 depicts a schematic diagram of an example of operating hardware for use on the valve positioner of FIG. 1.

FIG. 2 depicts a schematic diagram of an example of the valve positioner 100 of FIG. 1. The display unit 116 may include a display 124, like an LCD, that provides a visualization 126, typically alpha-numeric characters, icons, or the like. The measurement unit 122 may include an accelerometer 128 that can generate data that defines an angle 130 for the valve positioner 100 relative to a reference 132, typically a vertical or horizontal plane. Other devices (e.g., inclinometers or tilt sensors) may suffice as well. Values for the angle 130 may describe orientation for the valve positioner 100 on the valve assembly 102. Preferably, the value for the angle 130 is approximately zero degrees (0°). This value coincides with a "default" orientation, often a result of assembly of the valve positioner 100 onto the valve assembly 102 at a factory. However, the angle 130 may assume other values that are greater than or less than zero degrees (0°). Practically, these values are in a range of from 1° to 5°; however, this disclose contemplates that the orientation of the valve positioner 100 may deviate from the default orientation by more or less as well.

Figure 3:
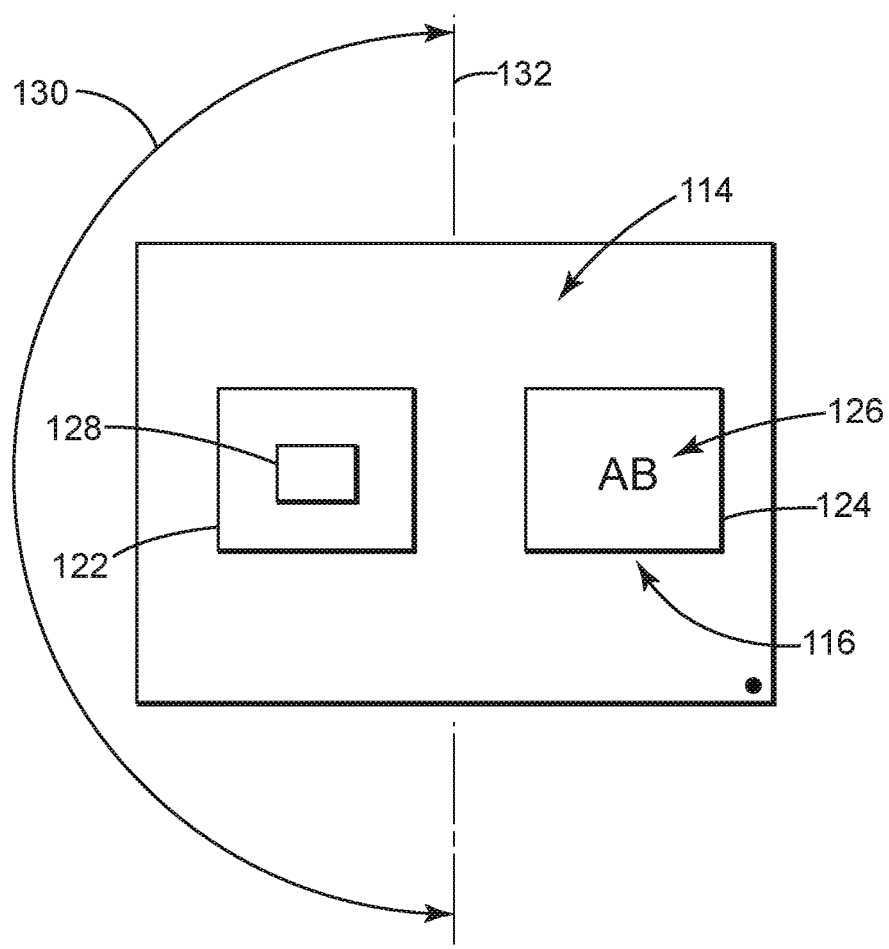
FIG. 3 depicts a schematic diagram of the example of FIG. 2 in an offset orientation on a valve assembly.
Figure 4:
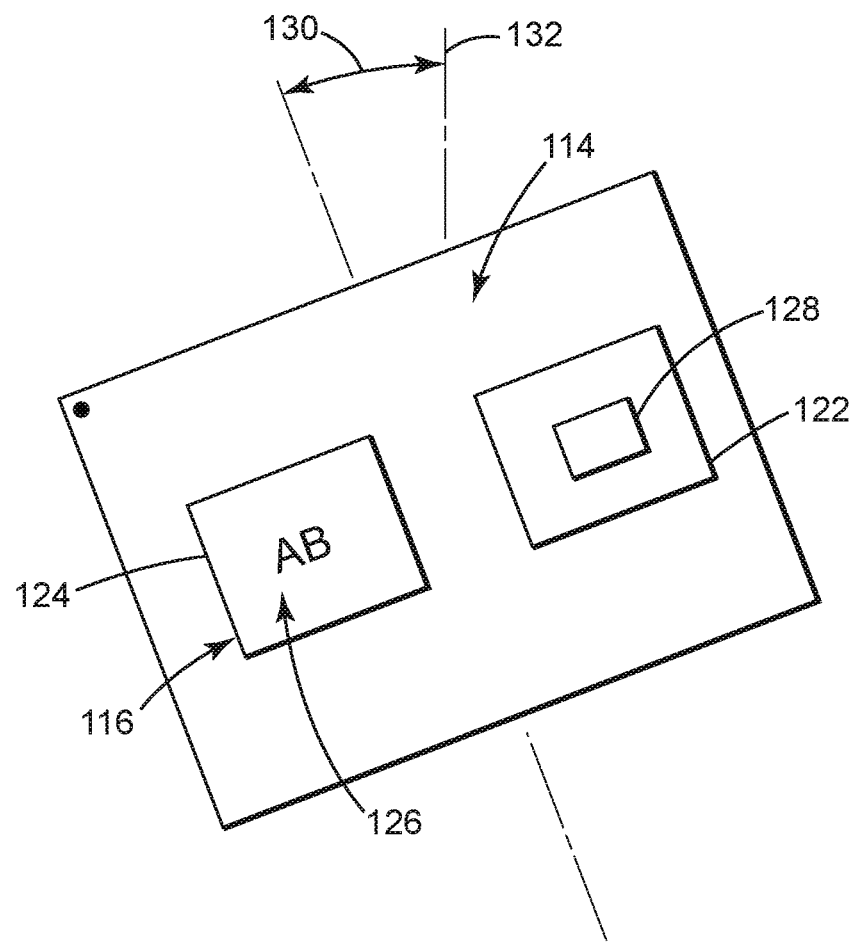
FIG. 4 depicts a schematic diagram of the example of FIG. 2 in an offset orientation on a valve assembly.

FIGS. 3 and 4 depict schematic diagrams of examples of the valve positioner 100 that are angularly offset from the default orientation. FIG. 3 shows the valve positioner 100 in an offset orientation that is 180°, or essentially "upside-down," relative to the default orientation of FIG. 2. This orientation may occur in the field, for example, as necessary to properly fit the valve positioner 100 on the valve assembly 102 at a point of installation on the process line. Notably, the operating hardware 114 can use orientation data (from the accelerometer 128) to make appropriate adjustments that maintains the "default" display orientation for information on the display 124.

FIG. 4 shows the valve positioner 100 only slightly askew relative to the default orientation of FIG. 2. This orientation may correspond with a "re-installed" orientation for the valve positioner 100 on the valve assembly 102. The re-installed orientation may follow maintenance to remove (and replace) the valve positioner 100 on the valve assembly 102. This process may require that the valve positioner 100 is separate from the valve assembly 102 on the process line, for example, to update hardware (or software). The process may reuse the "original" valve assembly with these updates. However, in some cases, the process replaces the "original" valve positioner 100 (or "first valve positioner") with a "new" valve positioner 100 (or "second valve positioner"). This process may coincide with operations that effectively upload data from the first valve positioner onto the second valve positioner, also known as "cloning." Notably, the improvements herein are effective to avoid defects in operation of the second valve positioner that makes use of "cloned" data from the first valve positioner. These defects may occur in data that defines the measured position of the closure member 110, which in turn can frustrate use of either the fully-opened mode or the tight shut-off mode.

Figure 5:
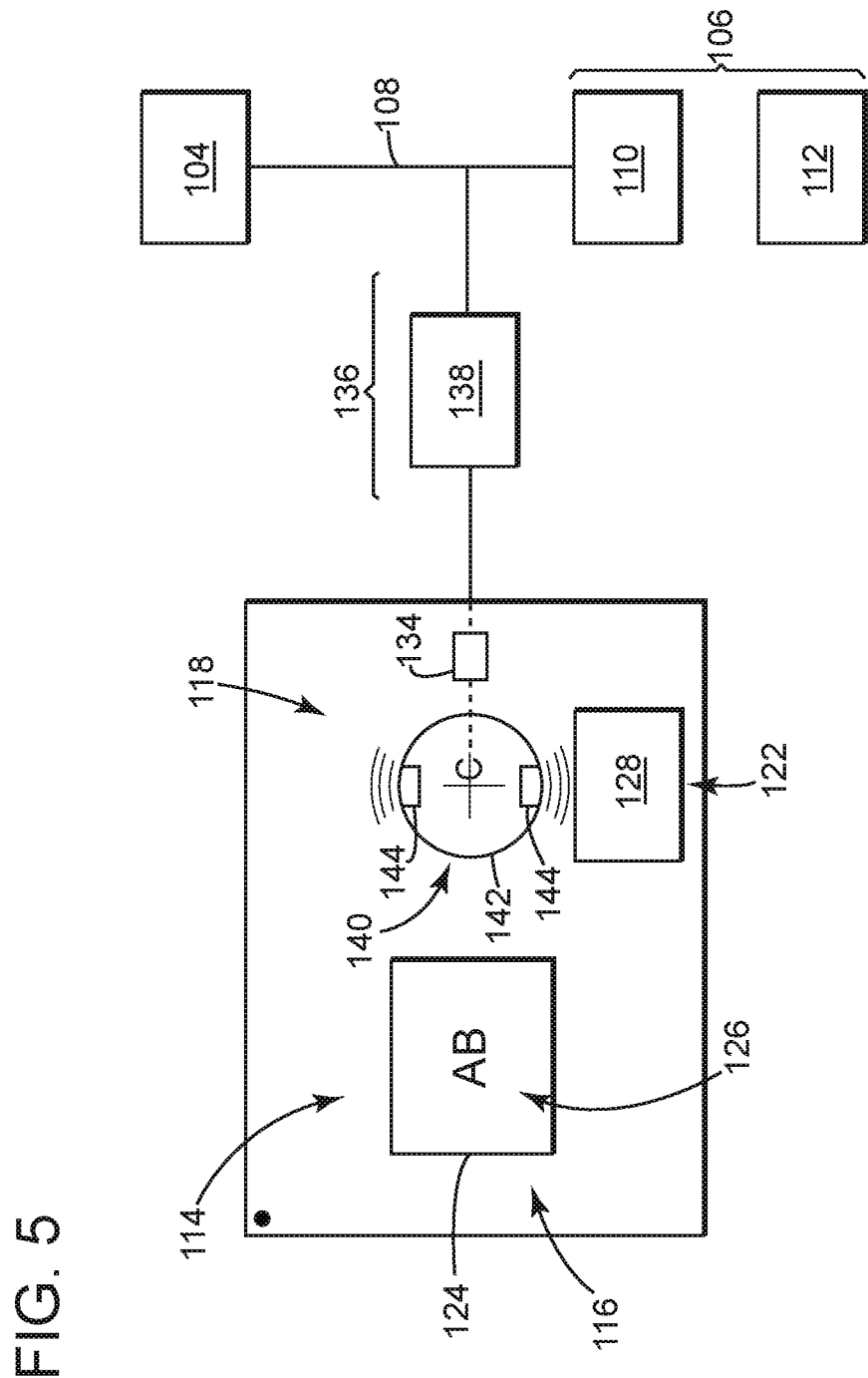
FIG. 5 depicts a schematic diagram of an example of operating hardware for use on the valve positioner of FIG. 1 that can measure position of a closure member of a valve.

FIG. 5 depicts a schematic diagram of exemplary structure for the position sensor 118 for use on valve positioner 100 of FIG. 1. This structure may include a magnetic flux sensor 134, although this disclosure contemplates use of other device technology, like ultrasonic, piezoelectric, or optically sensitive, as well. The magnetic flux sensor 134 may integrate as a component of the operating hardware 114 that resides in the valve positioner 100. When the valve positioner 100 is on the valve assembly 102, this component is proximate a position transfer unit 136 that conveys movement on the valve 106 to the valve positioner 100. Components for the position transfer unit 136 are independent from the valve positioner 100. This feature permits the valve positioner 100 to separate from (and replace onto) the valve assembly 102 for maintenance noted herein. In one implementation, the position transfer unit 136 may include a linkage 138 (or other mechanism that can transfer movement) that couples the valve stem 108 with a rotatable unit 140 inside of the valve positioner 100. The rotatable unit 140 may include an annular drum 142 that supports a pair of magnets 142 that are annularly offset from one another, e.g., by 180°. In use, the linkage 138 causes the annular drum 142 to rotate concomitantly with the valve stem 108. The magnetic flux sensor 130 resides proximate the annular drum 138 so that data corresponds with changes in polarity from the rotating magnets 132. The operating hardware 114 may correlate these changes to identify the position for the closure member 110. In one implementation, the magnetic flux sensor 134 may assume a first position, shown here to align the magnetic flux sensor 130 on or with the center of rotation (C) for the annular drum 138. This first position often corresponds with the default orientation for the valve positioner 100 on the valve assembly 102.

Figure 6:
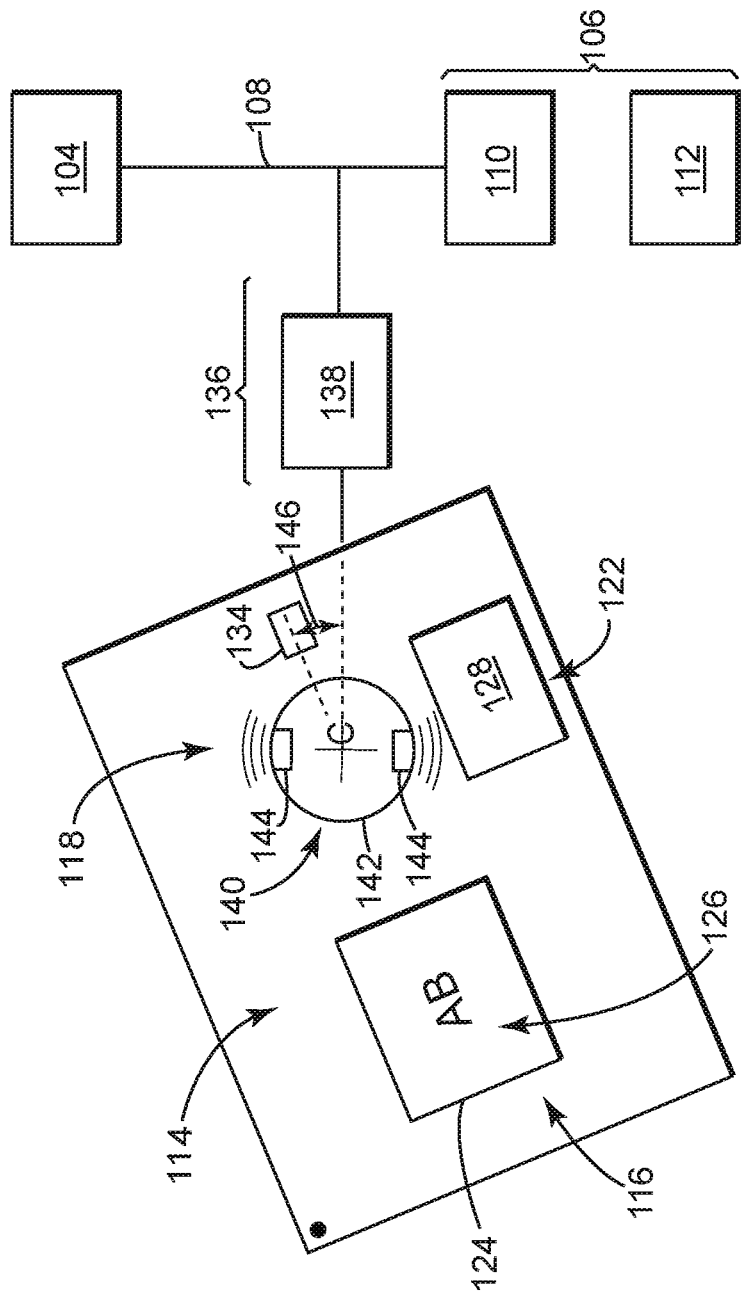
FIG. 6 depicts a schematic diagram of the example of FIG. 5 in an offset orientation on a valve assembly.

FIG. 6 depicts a schematic diagram of the valve positioner 100 that is offset from its default orientation in FIG. 5. The magnetic flux sensor 134 assumes a second position that is offset from the first position by an angular offset 146. Examples of the angular offset 146 may be consistent with the angle 130 because the magnetic flux sensor 134 mounts or affixes in the valve positioner 100 (as part of the operating hardware 114). In use, the angular offset 146 changes the relationship between the magnetic flux sensor 134 and the center of rotation (C) on the annular drum 140. Notably, the operating hardware 114 can account for the angular offset 146 in calculations to determine whether to implement the fully-opened mode or the tight-shut off mode with the closure member 110 proximate the hardstop limits 120.

Figure 7:
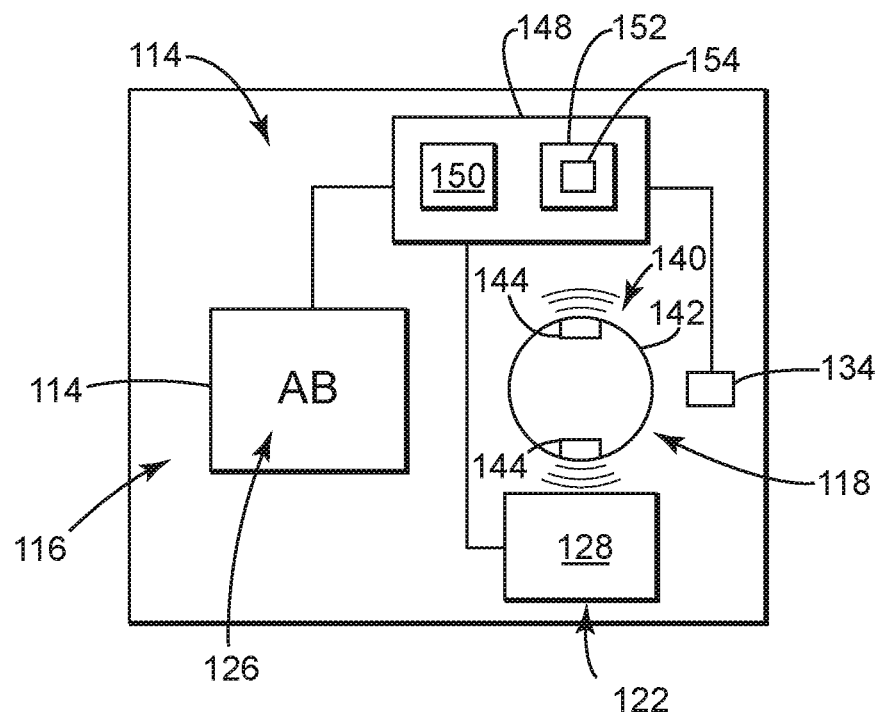
FIG. 7 depicts a schematic diagram of an example of operating hardware for use on the valve positioner of FIG. 1 that process signals from sensors.

FIG. 7 depicts a schematic diagram of topology for the valve positioner 100 of FIG. 1. The operating hardware 114 may include a processing unit 148 that has computing components like a processor 150 that couples with memory 152. Executable instructions 154 may reside on one or both of the computing components 150, 152. Data from the accelerometer 128 and flux sensor 134 may reside on the memory 152 as well. The executable instructions 154 may code one or more of these stages as a computer program, like software or firmware. The computer program may configure the processor 150 for functionality that can improve performance of the valve positioner 100 to identify and correct for the angle 130 of the valve positioner 100 on the valve assembly 102.

Figure 8:
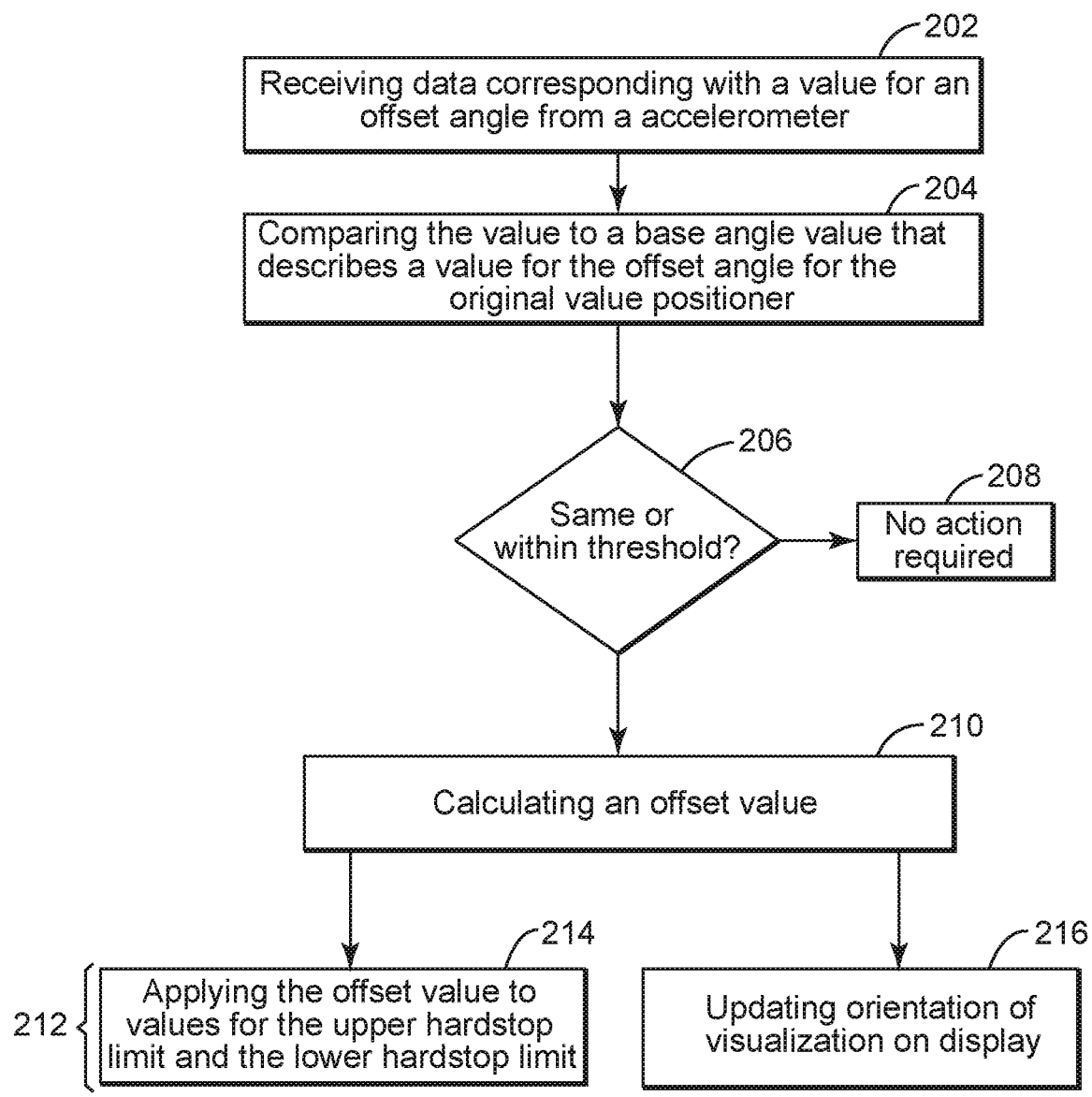
FIG. 8 depicts a flow diagram of an exemplary embodiment of a method to operate the valve positioner of FIG. 1.

FIG. 8 depicts a flow diagram for an exemplary method 200 with stages to account for orientation of the valve positioner 100 of FIG. 1 following maintenance. These stages may correlate to one or more executable instructions 154. In one implementation, the method 200 may include, at stage 202, retrieving data corresponding with a value for an offset angle from the accelerometer for a replacement valve positioner. This replacement valve positioner may be "new" hardware or "updated" hardware, particularly as relates to cloning procedures noted here. The method 200 may also include and, at stage 204, comparing this value to a base angle value that describes an offset angle for the previously-installed valve positioner. At stage 206, the method 200 may include stages to determine whether actions are necessary to correct for the orientation of the replacement valve positioner. For example, if the values are the same or within some threshold, then no action is required (at stage 208). If the value is different, the method 200 may include, at stage 210, calculating an offset value, for example, the value that reflects a relationship between the offset angle and the base angle value. The method 200 may also include, at stage 212, correcting functionality on the valve positioner 100, which may include, at stage 214, applying the offset value to values for the upper hardstop limit and the lower hardstop limit or, at stage 216, updating the orientation of the visualization on the display.

Figure 9:
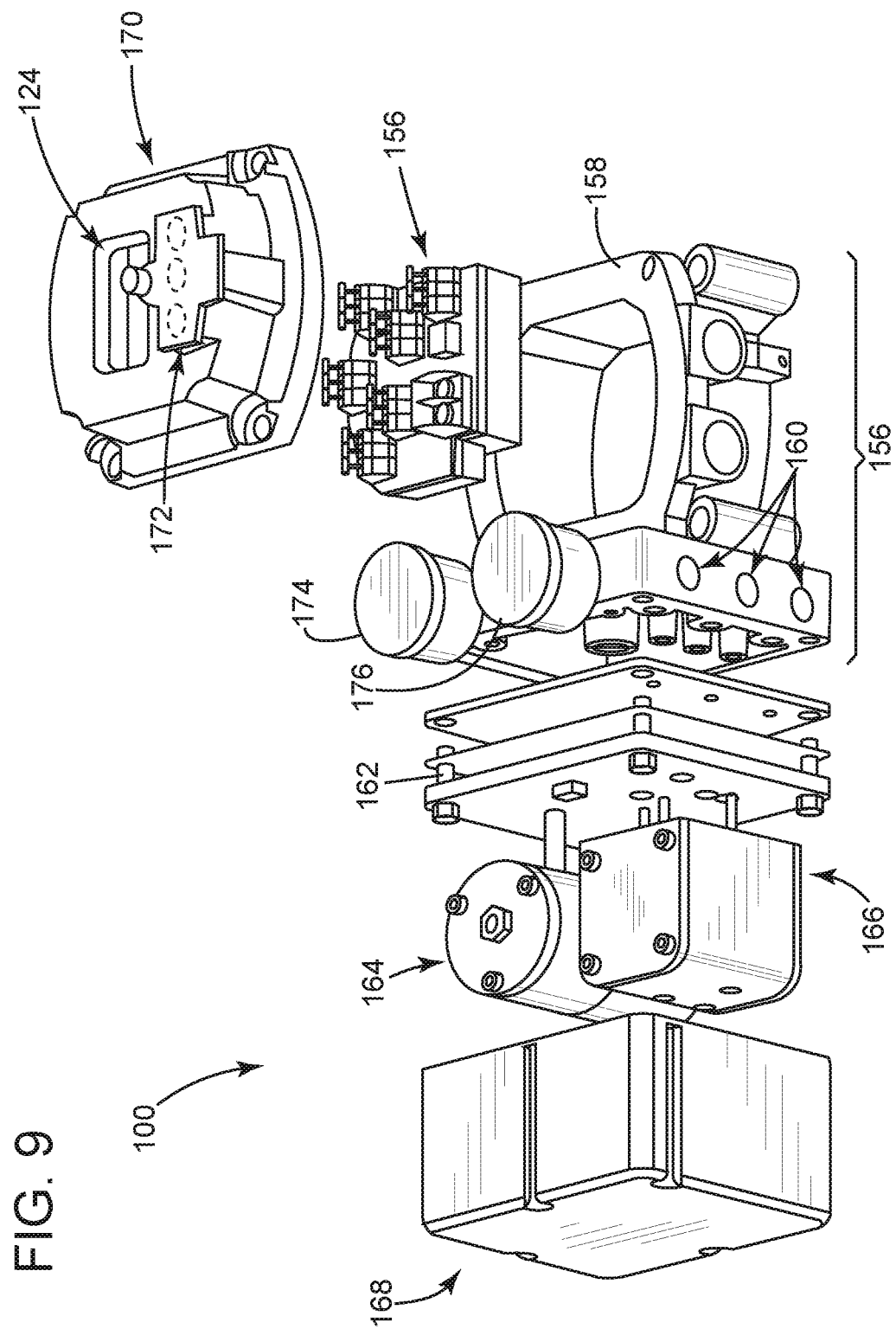
FIG. 9 depicts a perspective view of exemplary structure for the valve positioner of FIG. 1.

FIG. 9 depicts a perspective view of exemplary structure for the valve positioner 100 in exploded form. The valve positioner 100 may include a manifold 156 having a manifold body 158, typically machined or formed metal, plastic or composite. The manifold body 158 may include flow features 160 (e.g., openings, flow paths, etc.) to direct fluid among the components of the manifold 156. Standoff devices 162 may operate to mount a converter unit 164, like a current-to-pressure converter, and relay 166 to the manifold body 158. The units 164, 166 work together to deliver the pneumatic signal to the actuator 104. As also shown, the valve positioner 100 may also have an enclosure, shown as covers (e.g., a first cover 168 and a second cover 170). The covers 168, 170 may secure with the manifold body 158 to protect the control components from conditions that prevail in the environment surrounding the valve assembly 102. The second cover 170 may incorporate the display 124, as well as a pushbutton input device 172 may operate as the primary local user interface to allow an end user (e.g., technician) to interact with the valve positioner 100. This feature may be important for regular maintenance, configuration, and setup, for example, to allow the end user to exit from valve operating mode and step through a menu structure to manually perform functions such as calibration, configuration, and monitoring. In one implementation, the valve positioner 100 may further include one or more gauges (e.g., a first gauge 174 and a second gauge 176) that can provide an indication of the flow conditions (e.g., pressure, flow rate, etc.) of the fluid that the valve positioner 100 uses to operate the valve 106 in the valve assembly 102.

Figure 10:
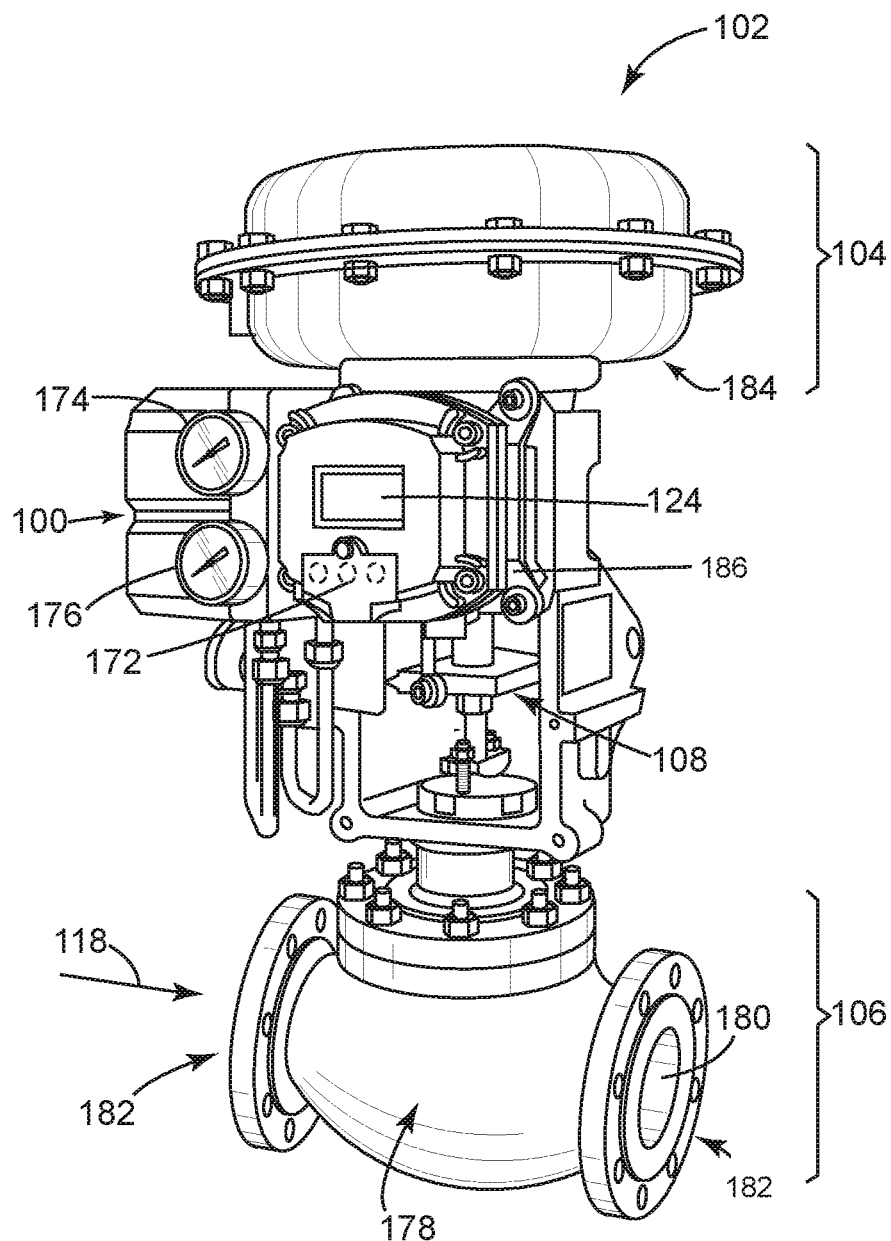
FIG. 10 depicts a perspective view of exemplary structure of a valve assembly that includes the valve positioner of FIG. 9.

FIG. 10 depicts a perspective view of exemplary structure for the valve assembly 102. This structure may be useful to regulate process fluids in industrial process lines typical of industries that focus on chemical production, refining production, and resource extraction. As shown, the valve 106 may include a fluid coupling 178 that forms a flow path 180 with flanged, open ends 182. Valve components like the closure member 110 and the seat 112 may reside inside of the fluid coupling 178 (and, thus, are hidden in the present view). The actuator 104 may include a bulbous housing 184, typically with two pieces that clamp about the edges to entrap a diaphragm (not shown) round the periphery. As noted herein, the actuator often turns pressurized air into mechanical load that modulates movement of the closure member 110 to move relative to the seat 112 between, for example, an open position, a partially-open position, and a closed position. The valve positioner 100 may fasten to a bracket 186 that is part of the valve assembly 102. Fasteners such as bolts are useful for this purpose. When mounted, the rotatable unit 136 (FIG. 6) extends into the back of the manifold 156 (FIG. 9).

In view of the foregoing discussion, the embodiments herein incorporate devices to measure orientation, or angle, of the valve positioner on the bracket 186. These embodiments ensure data displays independent of the orientation, essentially to ensure that the end user can readily access and read numbers, letters, or other indicators on the display. As also noted, the embodiments can also ensure use of certain operating modes or functions occurs at the correct time. This feature may prevent damage to the device that might occur with the closure member in very close proximity to the seat. A technical effect of the proposed embodiments is to afford the device with improved functionality that can serve to facilitate maintenance and repair, particularly as part of "cloning" procedures.

Topology for circuitry herein may leverage various hardware or electronic components. This hardware may employ substrates, preferably one or more printed circuit boards (PCB) with interconnects of varying designs, although flexible printed circuit boards, flexible circuits, ceramic-based substrates, and silicon-based substrates may also suffice. A collection of discrete electrical components may be disposed on the substrate, effectively forming circuits or circuitry to process and generate signals and data. Examples of discrete electrical components include transistors, resistors, and capacitors, as well as more complex analog and digital processing components (e.g., processors, storage memory, converters, etc.). This disclosure does not, however, foreclose use of solid-state devices and semiconductor devices, as well as full-function chips or chip-on-chip, chip-on-board, system-on chip, and like designs. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A valve assembly, comprising:
    a pneumatic actuator;
    a valve having a closure member coupled with the pneumatic actuator and moveable relative to a seat;
    a valve positioner coupled to the pneumatic actuator to provide a pneumatic signal to set a position of the closure member relative to the seat;
    an accelerometer coupled with the valve positioner to generate data in response to orientation of the valve positioner;
    a rotating drum extending into the valve positioner; and
    a magnetic flux sensor disposed in proximity to the rotating drum and affixed to the valve positioner,
    wherein the valve positioner is operative to process data from the accelerometer to correlate an angle of the magnetic flux sensor relative to a center of the rotating drum with travel limits for travel of the closure member in the valve.

2. The valve assembly of claim 1, wherein the valve positioner is operative to process data from the accelerometer to update travel limits from a first value to a second value that is different from the first value.

3. The valve assembly of claim 1, wherein the valve positioner is operative to process data from the accelerometer to set values that correspond with parameters for the pneumatic signal.

4. The valve assembly of claim 1, further comprising:
    a display,
    wherein the valve positioner is operative to process data from the accelerometer to set orientation for data that appears on the display.

5. The valve assembly of claim 1, further comprising:
    a display having a default orientation for visualizing data,
    wherein the valve positioner is operative to process data from the accelerometer to maintain the default orientation on the display.

6. The valve assembly of claim 1,
    wherein the magnetic flux sensor to provide data that describes a measured position for the closure member.

7. The valve assembly of claim 1,
    wherein the angle that corresponds with orientation of the valve positioner.

8. The valve assembly of claim 1, further comprising:
    a bracket, wherein the valve positioner secures to the bracket.

9. The valve assembly of claim 1, wherein the travel limits correspond to hardstop limits for the closure member.

10. The valve assembly of claim 1, wherein the valve positioner is operative to set an operating mode according to the travel limits.

11. The valve assembly of claim 1, wherein the valve positioner is operative to set a fully-opened mode that causes the closure member to move to a position farthest from the seat.

12. The valve assembly of claim 1, wherein the valve positioner is operative to set a tight shut-off mode that causes the closure member to move to a closed position in response to commanded positions below a lower limit.

13. The valve assembly of claim 1, wherein the valve positioner is operative to account for the angle to set an operating mode.

14. The valve assembly of claim 1, wherein the valve positioner is removable.

15. The valve assembly of claim 1, wherein the accelerometer is located inside of the valve positioner.

16. The valve assembly of claim 1, further comprising:
    a pair of magnets coupled with the rotating drum,
    wherein the magnetic flux sensor senses changes in polarity as between the pair of magnets.

17. The valve assembly of claim 1, wherein the travel limits define maximum travel and minimum travel for the closure member.

* * * * *